United States Patent [19]

Hicok et al.

[11] Patent Number: 5,588,128
[45] Date of Patent: Dec. 24, 1996

[54] DYNAMIC DIRECTION LOOK AHEAD READ BUFFER

[75] Inventors: Gary D. Hicok, Mesa, Ariz.; Eric A. Hildebrandt; Micheal H. Zhu, both of San Jose, Calif.

[73] Assignee: VLSI Technology, Inc., San Jose, Calif.

[21] Appl. No.: 607,372

[22] Filed: Feb. 27, 1996

Related U.S. Application Data

[63] Continuation of Ser. No. 42,323, Apr. 2, 1993, abandoned.

[51] Int. Cl.⁶ .............................. G06F 12/08; G06F 13/00
[52] U.S. Cl. ...................... 395/414; 364/DIG. 1; 364/DIG. 2; 364/238.6; 395/464
[58] Field of Search ...................... 364/DIG. 1, DIG. 2, 364/238.4, 238.6, 239, 244.3; 395/481, 464, 412, 413, 414

[56] References Cited

U.S. PATENT DOCUMENTS

| 4,714,994 | 12/1987 | Oklobdzija et al. | 395/425 |
|---|---|---|---|
| 4,916,658 | 4/1990 | Lee et al. | 364/900 |
| 5,050,126 | 9/1991 | Tanaka et al. | 365/189.07 |
| 5,060,188 | 10/1991 | Zulian et al. | 395/414 |
| 5,093,777 | 3/1992 | Ryan | 395/414 |
| 5,136,702 | 8/1992 | Shibata | 395/425 |
| 5,168,557 | 12/1992 | Shibuya | 395/414 |
| 5,287,487 | 2/1994 | Priem et al. | 395/414 |
| 5,345,560 | 9/1994 | Miura et al. | 395/250 |
| 5,371,870 | 12/1994 | Goodwin et al. | 395/425 |
| 5,377,341 | 12/1994 | Kaneko et al. | |
| 5,442,767 | 8/1995 | Eickemeyer et al. | 395/414 |
| 5,450,561 | 9/1995 | Ryan | 395/414 |

*Primary Examiner*—Tod R. Swann
*Assistant Examiner*—Tuan Thai
*Attorney, Agent, or Firm*—Harry M. Weiss; Jeffrey D. Moy; Harry M. Weiss & Associates, P.C.

[57] ABSTRACT

A look ahead read buffer automatically senses the direction of the read sequence, sets the direction based on the current and previous read addresses, and prefetches data from memory to allow a Host device such as a CPU to read data out of the look ahead read buffer with no wait states, rather than accessing this data directly in slower memory that requires wait states. This read buffer is especially useful in applications such as display controllers that store and retrieve data in sequential format. The display memory may be partitioned into pages, and the read buffer will then determine and set the appropriate direction at page boundaries, and will not change direction within that page of display data. In addition, the read buffer inhibits reads that occur outside of the current page of display data, ignoring the effects of other reads that do not directly affect the display.

11 Claims, 3 Drawing Sheets

DYNAMIC DIRECTION LOOK AHEAD READ BUFFER

This is a continuation of application Ser. No. 08/042,323 filed on Apr. 2, 1993, now abandoned.

BACKGROUND OF THE INVENTION

1. Field of the Invention

This invention generally relates to electronic read buffers and methods, and, more specifically, relates to a look ahead read buffer which dynamically detects and changes the direction of prefetching to the buffer depending on the direction in which the data is read from the memory.

2. Description of the Related Art

Read buffers have become common in a variety of different applications to provide temporary storage between a memory device and a host device which reads data from the memory device. In recent times read buffers have been modified to look ahead and prefetch the needed data before it is required by the Host device. The memory device is typically relatively large, with an access time that typically requires the Host device to insert one or more wait states in each memory read cycle. The look ahead read buffer, which is small relative to the memory device, typically has an access time fast enough to allow the Host device to access its data without inserting wait states. This allows the look ahead read buffer to prefetch data from memory and to provide this data to the Host device without delay caused by wait states.

Look ahead read buffers generally have either a fixed or a programmable look ahead direction. Software applications may store and retrieve data in memory in different locations or directions, since the memory is generally provided for the Host device to use at its discretion. Thus each software application program stores and retrieves data as it sees fit, following no general trend or standard. In the case of a fixed-direction look ahead read buffer, if the data is stored in memory in a direction opposite to the fixed direction of the buffer, the look ahead read buffer cannot prefetch this data since it is stored in the wrong direction, and the look ahead read buffer becomes useless. If the look ahead read buffer has a programmable direction, the application software must set the direction to tell the look ahead read buffer in which direction to prefetch the data. Thus the programmable variety only works with application software that has appropriate software drivers to set the direction, which is not normally provided with standard software application programs. Neither the fixed direction nor the programmable direction look ahead read buffers provide a performance boost for standard software application programs that store data in memory in different directions.

Therefore, there existed a need to provide a look ahead read buffer that can read data in both the forward and backward directions, which dynamically changes the direction of the read buffer as required without the software having to know of the existence or configuration of the look ahead read buffer. This dynamic direction look ahead read buffer would thus be transparent to the application program, and would give a great performance boost to any application program, regardless of whether the data is stored in an ascending or a descending order.

SUMMARY OF THE INVENTION

It is an object of this invention to provide a look ahead read buffer and method which dynamically changes its prefetch direction automatically as the Host device changes the direction of its reads from the memory device.

It is a further object of this invention to provide a direction control circuit and method for dynamically changing the prefetch direction of a look ahead read buffer automatically as the Host device changes the direction of its reads from the memory device.

According to the first embodiment of the present invention, a Dynamic Direction Look Ahead Read Buffer is provided. For illustrative purposes, this Read Buffer is described in relation to a display controller device, such as a typical Video Graphics Array (VGA) Controller, within a small computer system, such as an IBM PC-compatible desktop computer. The VGA Controller has Display Memory which contains Display Data which the computer's Central Processing Unit (CPU) typically writes and reads as required by the applications program being executed by the computer. This Display Memory typically has an access time which requires the CPU to insert wait states when reading Display Data directly from the Display Memory, slowing down these memory accesses. The Read Buffer, however, is a smaller and faster memory device, which allows the CPU to access its data with no wait states. The Read Buffer is therefore placed between the CPU and the Display Memory such that Display Data is retrieved from Display Memory and stored in the Read Buffer, with the CPU reading this Display Memory from the faster Read Buffer rather than directly from the slower Display Memory.

Display Data is typically written by the CPU into the Display Memory in sequential fashion in page format, in a direction determined by the applications program. The Dynamic Direction Look Ahead Read Buffer is located between the CPU and the Display Memory. When the CPU needs to read the Display Data within the Display Memory, it simply begins reading at the appropriate addresses, and the Read Buffer automatically detects the direction of the reads and prefetches the required Display Data from the Display Memory. The direction is set by comparing the present read address with the previous read address. The Read Buffer ignores spurious reads by inhibiting a write from the Display Memory to the Read Buffer when the current read address is not in the same page of Display Data as the previous read address. Thus the Read Buffer dynamically changes direction as required and ignores read cycles outside of the present page of Display Data. This is possible due to the highly sequential format of Display Data written and read by the CPU, and allows the CPU to read Display Data from the Read Buffer with no wait states. This gives a boost to system speed and performance, regardless of the direction of storing the Display Data that is used by the applications program.

According to the second embodiment of the present invention, a Read Buffer Direction Control Circuit is provided which dynamically detects and changes the direction of reads in a look ahead read buffer to correspond to the direction being actually read by the Host device, or CPU in a desktop computer system. This Read Buffer Direction Control Circuit has a Latch and Decode circuit which latches each read address and outputs the Current Read Address and the Previous Read Address that was latched on the previous read cycle. In addition, this Latch and Decode circuit also decodes CPU Control signals to generate a MEMORY READ signal which is only active during read cycles to memory space of the CPU. In the alternative, the CPU can drive a MEMORY READ signal directly to indicate a read cycle to the CPU memory space. A Range Comparator compares the upper address bits of the Previous Read Address with the upper address bits of the Current Read Address, and generates an IN RANGE output if the address bits are the same, indicating that the Current Read Address is in the same page as the Previous Read Address. A Direction Comparator compares the lower address bits of the Previous Read Address with the lower address bits of the Current Read Address, and generates a CURRENT>PREVIOUS signal. This signal indicates the direction of the read sequence by going high to indicate the read sequence is in ascending order and by going low to indicate the read sequence is in descending order.

The IN RANGE output from the Range Comparator is gated with the MEMORY READ signal, with the gated output driving a multiplexer which selects the CURRENT>PREVIOUS signal as an input to a D flip-flop when both IN RANGE and MEMORY READ are both asserted. The latched output of the D flip-flop is the UP/DOWN signal output to the Read Buffer, indicating the direction of the read. The D flip-flop for latching the UP/DOWN signal is clocked by a clock typically on the display subsystem to synchronize this signal to other signals in the system. This Read Buffer Direction Control Circuit allows the UP/DOWN output to dynamically change as needed by simply monitoring the direction of CPU memory reads, and changing the output as required.

The foregoing and other objects, features and advantages will be apparent from the following description of the preferred embodiment of the invention as illustrated in the accompanying drawings.

DESCRIPTION OF THE PREFERRED EMBODIMENTS

Figure 1:
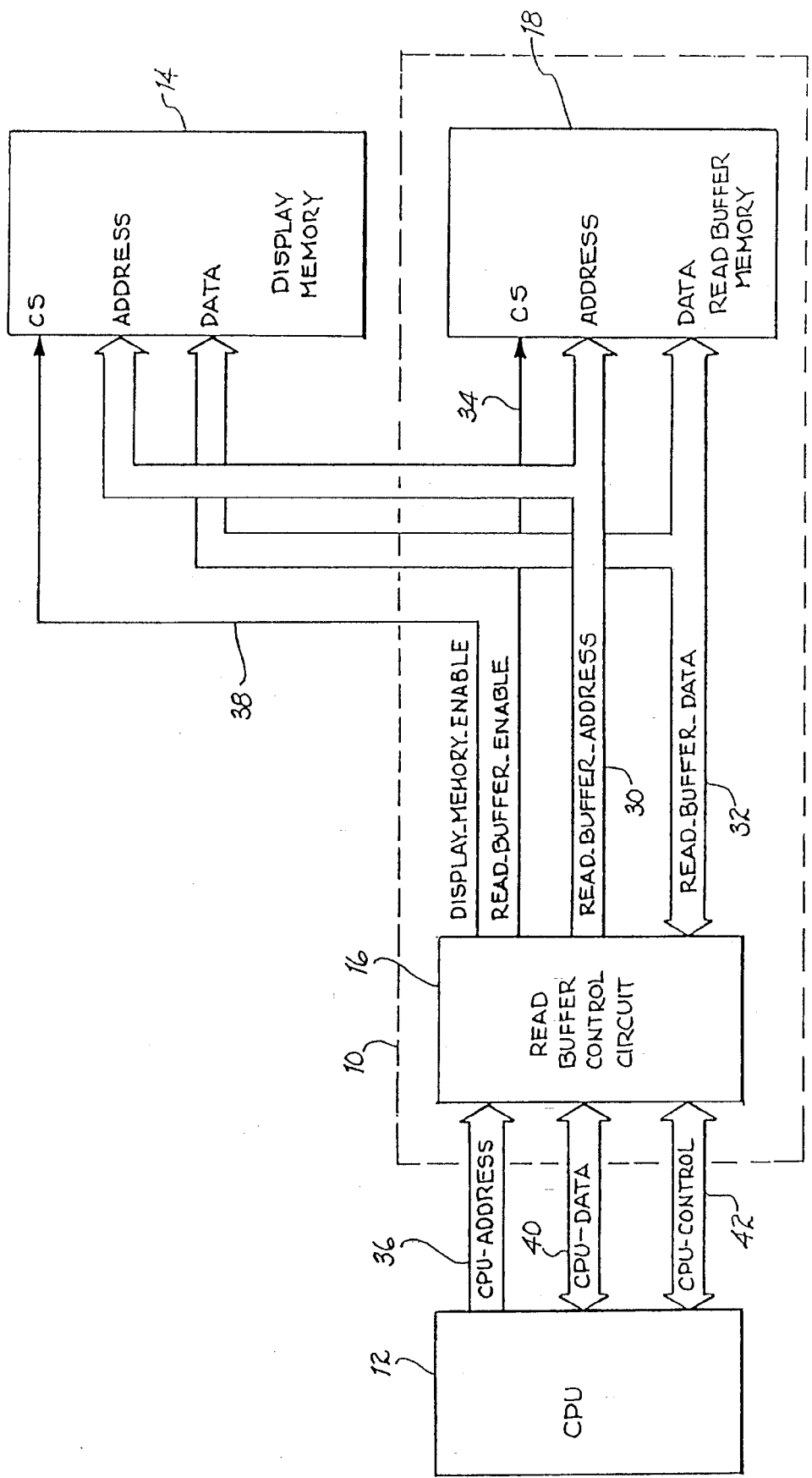
FIG. 1 is a block diagram schematic of the Dynamic Direction Look Ahead Read Buffer of the present invention when used between a CPU and a Display Memory.

FIG. 1 shows a general block diagram of the Read Buffer 10 of the present invention located between CPU 12 and Display Memory 14. While the configuration shown in the figures and described herein assumes a specific implementation with a CPU in a typical IBM-compatible desktop computer system and Display Memory on a typical VGA Controller within this computer system, it is obvious that other host devices besides a CPU could be used, and that the Display Memory could be replaced with other memory devices, depending on the specific application. Read Buffer 10 in FIG. 1 is comprised of a Read Buffer Control Circuit 16 and a Read Buffer Memory 18, connected by a Read Buffer Address bus 30, a Read Buffer Data bus 32, and a Read Buffer Enable line 34. The Display Memory 14 is connected to Read Buffer Address bus 30, to Read Buffer Data bus 32, and to a Display Memory Enable line 38 as shown. The Read Buffer Control Circuit 16 is connected to CPU 12 via CPU Address bus 36, CPU Data bus 40, and CPU Control signals 42.

Display Data within Display Memory 14 is typically stored in sequential blocks of memory known as pages. The size of the pages is not critical, but for illustrative purposes this discussion will assume a page size of 256 bytes of display data, which corresponds to the lower eight bits of the read address. Note that the CPU 12 could write Display Data to Display Memory 14 either through Read Buffer 10, or via a separate write interface (not shown). This discussion assumes the CPU 12 can store Display Data in Display Memory 14, without showing explicitly how this is accomplished, since this is not critical to the present invention.

The CPU 12 will typically read one or more pages of Display Data from Display Memory 14 at any given time. When the CPU 12 begins reading a page of Display Data from Display Memory 14, the Read Buffer Control Circuit 16 decodes the CPU Control signals 42 to determine that a memory read is occurring, and monitors the addresses which the CPU 12 reads from the Display Memory 14 to determine which direction the CPU 12 is reading. The direction is determined by comparing the address of the previous read with the address of the current read. Once the direction is determined and set, it typically remains the same for the entire page, and will change only when a new page is encountered.

Once the Read Buffer Control Circuit 16 determines the direction of reads for a given page, it then prefetches Display Data from Display Memory 14 and stores this Display Data in Read Buffer Memory 18. As the CPU attempts to read Display Data, the Read Buffer Control Circuit 16 will determine whether the needed data has been prefetched into the Read Buffer Memory 18. If this needed data has been prefetched, Read Buffer Control Circuit 16 will deliver this data from Read Buffer Memory 18 with no wait states by the CPU. If the needed data has not been prefetched, Read Buffer Control Circuit 16 will deliver this data from Display Memory 14, which will require wait states by the CPU 12. Due to the highly sequential format for Display Data, this Read Buffer 10 provides a significant performance boost in display applications.

Assume the CPU reads at the beginning of a page boundary with ascending addresses, and that the Read Buffer Memory 18 is initially empty. The data at the first location within this page of Display Memory 14 has not yet been transferred to the Read Buffer 10 since the Read Buffer 10 is empty. The CPU 12 performs a read at this first address, and since the data is not within the Read Buffer Memory 18, the Read Buffer Control Circuit 16 asserts the Display Memory Enable line 38, which causes the Display Memory 14 to output the data on the Read Buffer Data bus 32. This data flows through the Read Buffer Control Circuit 16, and is thus presented on the CPU Data bus 40, allowing the CPU 12 to read this data. When the CPU 12 reads the second location within this page of Display Data, the Read Buffer Control Circuit 16 compares this address to the previous read address, and from this information it readily determines whether the direction of the reads within this page is up or down. Once the direction of the reads is determined, the Read Buffer Control Circuit 16 begins transferring the entire page of data in this same direction to the Read Buffer Memory 18. The Read Buffer Memory 18 is a high speed memory device which the CPU 12 can read with no wait states. In this manner the Read Buffer Control Circuit 16 fills the Read Buffer Memory 18 with data, prefetching the Display Data from Display Memory 14 so the CPU 12 will not have to incur the normal number of wait states in transferring this page of data. By removing these wait states, performance of the computer system is enhanced.

The operation of the Read Buffer 10 can be best understood by performing certain CPU functions and establishing a sequence of CPU commands for each of these function, showing the effects of these commands on the system shown in FIG. 1. This sequence of commands is shown in the Tables 1 and 2 below.

TABLE 1

Read Buffer Activity for Ascending Page Read

Assumptions:
1) Read Buffer Memory is initially empty
2) Display Memory Page 1 starts at address 010
3) Display Memory Page 2 starts at address 020
4) CPU Status is at address 100

CPU Function

Read Page 1 from Display Memory in Ascending Order

| CPU Commands | Result |
|---|---|
| Memory Read from 010 | Read Buffer 10 provides this data to CPU 12 from Display Memory 14 (asserts Display Memory Enable) |
| Memory Read from 011 | Read Buffer 10 provides this data to CPU 12 from Display Memory 14, sets direction to UP, and begins prefetching data from Display Memory 14 is ascending order and storing it in the Read Buffer 10 |
| Memory Read from 012 | Read Buffer 10 provides this data from its own memory |
| CPU Status Read from 100 | Read Buffer 10 is unaffected by this read since it is not in the same page, Page 1 (01X) |
| Memory Read from 013 | Read Buffer 10 provides this data from its own memory |
| . | . |
| Memory Read from 01F | Read Buffer 10 provides this data from its own memory |

TABLE 2

Read Buffer Activity for Descending Page Read

CPU Function

Read Page 2 from Display Memory in Descending Order

| CPU Commands | Result |
|---|---|
| Memory Read from 02F | Read Buffer 10 provides this data to CPU 12 from Display Memory 14, since this read is not in the same page as the previous read |
| CPU Status Read from 100 | Read Buffer 10 is unaffected by this read since it is not in the same page, Page 2 (02X) |
| Memory Read from 02E | Read Buffer 10 provides this data to CPU 12 from Display Memory 14, sets direction to DOWN, and begins prefetching data from Display Memory 14 in descending order and storing it in the Read Buffer 10 |
| Memory Read from 02D | Read Buffer 10 provides this data from its own memory |
| Memory Read from 02C | Read Buffer 10 provides this data from its own memory |
| . | . |
| Memory Read from 021 | Read Buffer 10 provides this data from its own memory |
| Memory Read from 020 | Read Buffer 10 provides this data from its own memory |

As shown in the stated assumptions in Table 1, the command sequences and results shown in Tables 1 and 2 assume the Read Buffer 10 is initially empty, with addresses assigned to Page 1, Page 2, and CPU Status. The CPU Status command simply represents a CPU read to memory space that is not in the same page of Display Data, such as when the CPU 12 processes an interrupt service routine or performs other "housekeeping" functions.

The first CPU function shown in Table 1 is to "Read Page 1 from Display Memory in Ascending Order." When the CPU 12 first reads from 010, the Read Buffer 10 must get this data from the Display Memory 14 and pass it on directly to the CPU 12 since the Read Buffer 10 is empty at this point. When the CPU 12 reads the next data at 011, the Read Buffer 10 must also get this data from the Display Memory 14, but this read cycle allows the Read Buffer 10 to determine that the reads are in ascending order, and it then begins to prefetch the Display Data from Display Memory 14 to store in its own internal memory. The data for all subsequent reads in Page 1 are read directly from the Read Buffer 10, which eliminates the wait states which would result from the CPU 12 reading the data directly from the slower Display Memory 14. Notice that the CPU Status Read doesn't affect the filling of the Read Buffer 10 since it ignores any reads that are outside the current page.

If the sequence in Table 2 were executed immediately after the sequence in Table 1, the results are as shown. The results are very similar to those discussed in Table 1. The first CPU read from 02F results in the Read Buffer 10 providing data to the CPU 12 from the Display Memory 14, since this is the first read from a new page. The second read must likewise be retrieved from Display Memory 14, but this allows the Read Buffer 10 to detect that the sequence is in descending order, and it proceeds to prefetch the data needed for subsequent data reads on Page 2. Notice that the CPU Status Read in Table 2 goes likewise unnoticed by Read Buffer 10 since it ignores any CPU memory read cycles outside of the current page.

Figure 2:
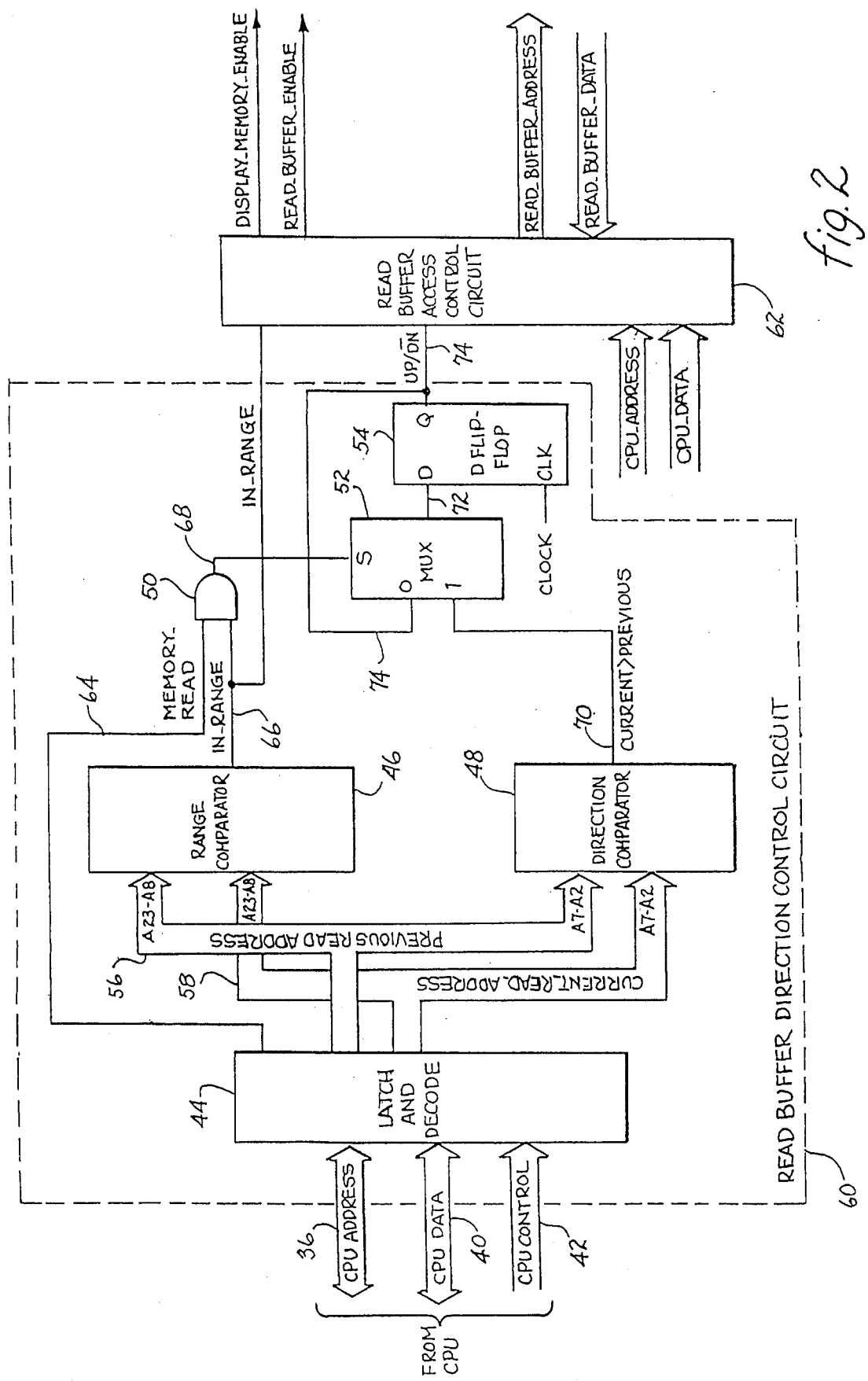
FIG. 2 is a block diagram schematic of the Read Buffer Control Circuit shown in FIG. 1, comprising the Read Buffer Direction Control Circuit and the Read Buffer Access Control Circuit.
Figure 3:
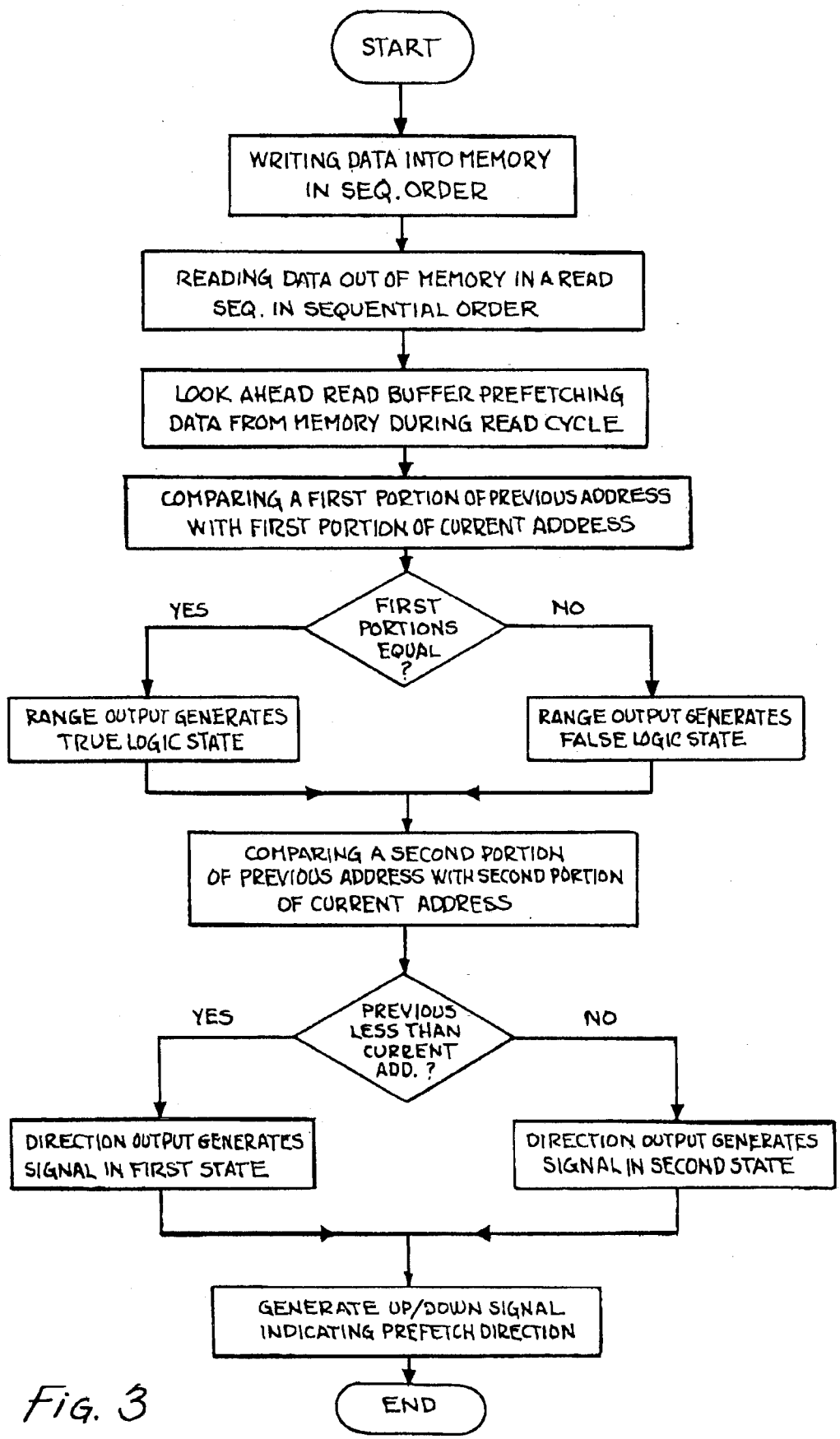
FIG. 3 shows a flow chart depicting a method for prefetching data in a computer system.

According to the second embodiment of the present invention, a Read Buffer Direction Control Circuit 60 is provided, as shown in a portion of FIG. 2. FIG. 2 shows the Read Buffer Control Circuit 16 of FIG. 1, comprising the Read Buffer Direction Control Circuit 60 and the Read Buffer Access Control Circuit 62. Referring to FIG. 2, the Read Buffer Direction Control Circuit 60 is comprised of a Latch and Decode block 44, a Range Comparator 46, a Direction Comparator 48, a gate 50, a Multiplexer (MUX) 52, and a D Flip-Flop 54. The Latch and Decode block 44 latches each read memory address by the CPU, and outputs both the Previous Read Address 56 (latched from the previous read cycle) and the Current Read Address 58 to Range Comparator 46 and Direction Comparator 48. Latch and Decode block 44 also decodes the CPU Control signals 42 to determine when a memory read occurs, and outputs MEMORY READ 64 to indicate a valid memory read cycle by the CPU. Some CPUs may output this MEMORY READ signal directly, in which case this decoding in the Latch and Decode block 44 becomes unnecessary.

Assuming the same 256 byte per page configuration of the first embodiment, and a 24 bit address space, the Range Comparator 46 compares the upper bits (A23–A8) of Previous Read Address 56 with the same upper bits of Current Read Address 58 to determine whether the Current Read Address 58 is in the same page as the Previous Read Address 56. If both these address are from the same page, the IN_RANGE output 66 is asserted to indicate that Current Read Address 58 and Previous Read Address 56 are from the same page. The Direction Comparator 48 compares the lower bits (A7–A2 in this specific example) of Previous Read Address 56 with the same lower bits of Current Read Address 58 to determine the direction of the read sequence. If Current Read Address 58 is greater than Previous Read Address 56, the CURRENT>PREVIOUS signal 70 is asserted to indicate the direction is up (ascending). If Current Read Address 58 is equal to or less than Previous Read Address 56, the CURRENT>PREVIOUS signal 70 is negated to indicate the direction is down (descending).

Gate 50 performs a logical AND on the MEMORY READ signal 64 and the IN RANGE signal 66, with the output 68 driving the Select input of the MUX 52. If either of the MEMORY READ signal 64 or the IN RANGE signal 66 are low, the Select Input of MUX 52 is driven low, causing the 0 input on MUX 52 to be output on line 72. The source of the 0 input on MUX 52 is the UP/DOWN signal 74 on D Flip-Flop 54. This simply forms a feedback path which assures that the present value of UP/DOWN 74 does not change until both the IN RANGE signal 66 and the MEMORY READ signal 64 are both high, at which time the CURRENT>PREVIOUS signal 70 is selected by MUX 52 and output on line 72, which is clocked through to the UP/DOWN signal 74.

The Read Buffer Direction Control Circuit 60 can thus dynamically detect changes in direction of the read sequence by simply monitoring the sequence of addresses and adjusting the UP/DOWN output 74 accordingly. Notice that IN RANGE 66 is also an output to Read Buffer Access Control Circuit 62, which allows this circuit to ignore any CPU read cycles to memory space that are not IN RANGE of (in the same page as) the previous memory read address.

While the invention has been described in its preferred embodiment, it is to be understood that the words which have been used are words of description rather than limitation, and that changes may be made within the purview of the appended claims without departing from the true scope and spirit of the invention in its broader aspects.

What is claimed is:

1. A look ahead read buffer comprising, in combination:

memory means for storing data;

control circuitry means coupled to said memory means for writing said data into said memory means in a sequential order and for reading said data out of said memory means in a read sequence in said sequential order, said sequential order being determined by a sequence of sequential addresses corresponding to locations of said data; and dynamic direction means within said control circuitry means for changing direction of said read sequence from a first state to a second state and from said second state to said first state, said first state corresponding to an ascending sequence of said sequential addresses and said second state corresponding to a descending sequence of said sequential addresses, said dynamic direction means comprising:

range comparator means for comparing a first portion of a previous read address with a first like portion of a current read address, and having a range output in a true logic state when said first portion of said previous read address is equal to said first like portion of said current read address, and having said range output in a false logic state when said first portion of said previous read address is not equal to said first like portion of said current read address;

directional comparator means for comparing a second portion of said previous read address with a second like portion of said current read address, and having a direction output in a first logic state when said second portion of said previous read address is less than said second like portion of said current read address, and having said direction output in a second logic state when said second portion of said previous read address is not less than said second like portion of said current read address; and logic means coupled to said range output and to said direction output for generating an UP/DOWN output indicating said prefetch direction, said UP/DOWN output reflecting the logic state of said direction output when said range output is in said true logic state.

2. The look ahead read buffer of claim 1 wherein said control circuitry means writes said data within a plurality of pages within said memory means and reads said data from said plurality of pages within said memory means.

3. The look ahead read buffer of claim 2 wherein said direction of said read sequence being in at least one of said first state and said second state within a given one page of said plurality of pages, said dynamic direction means changing said direction of said read sequence from said first state to said second state and from said second state to said first state when said read sequence begins a new page of said plurality of pages.

4. The look ahead read buffer of claim 1 further comprising means for inhibiting a write to said memory means when an address of said read sequence is not within the same page of said plurality of pages within said memory means.

5. The circuit according to claim 1 wherein said logic means further comprises latch means for synchronizing said UP/DOWN output with an edge of a clock signal.

6. A method for prefetching data in a computer system including the steps of:

writing data into a memory in a sequential order;

providing a look ahead read buffer to prefetch said data during read cycles;

reading said data out of said memory in a read sequence in said sequential order, said sequential order being determined by a sequence of sequential addresses corresponding to locations of said data;

said look ahead read buffer prefetching said data from said memory during said read cycles;

detecting and changing direction of said prefetching from a first state to a second state and from said second state to said first state, said first state corresponding to an ascending sequence of said sequential addresses and said second state corresponding to a descending sequence of said addresses, said detecting and changing direction comprising the steps of:

comparing a first portion of a previous read address with a first like portion of a current read address, and generating a range output in a true logic state when said first portion of said previous read address is equal to said first like portion of said current read address, and generating said range output in a false logic state when said first portion of said previous read address is not equal to said first like portion of said current read address;

comparing a second portion of said previous read address with a second like portion of said current read address, and generating a direction output in a first logic state when said second portion of said previous read address is less than said second like portion of said current read address, and generating said direction output in a second logic state when said second portion of said previous read address is not less than said second like portion of said current read address; and providing logic means coupled to said range output and to said direction output for generating an UP/DOWN output indicating said prefetch direction, said UP/DOWN output reflecting the logic state of said direction output when said range output is in said true logic state.

7. The method according to claim 6 wherein said data being stored in said memory in a plurality of pages within said memory.

8. The method according to claim 7 wherein said direction of said prefetching being in at least one of said first state and said second state within a given one page of said plurality of pages, said direction of said prefetching changing from said first state to said second state and from said second state to said first state when said read sequence begins a new page of said plurality of pages.

9. The method according to claim 6 further including the step of inhibiting a write to said look ahead read buffer when an address of a read cycle is not within the same page of said plurality of pages within said memory means as said read sequence.

10. The method of claim 6 further including the step of synchronizing said UP/DOWN output of said logic means with an edge of a clock signal.

11. A look ahead read buffer with dynamic direction means wherein said dynamic direction control means comprises:

range comparator means for comparing a first portion of a previous read address with a first like portion of a current read address, and having a range output in a true logic state when said first portion of said previous read address is equal to said first like portion of said current read address, and having said range output in a false logic state when said first portion of said previous read address is not equal to said first like portion of said current read address;

directional comparator means for comparing a second portion of said previous read address with a second like portion of said current read address, and having a direction output in a first logic state when said second portion of said previous read address is less than said second like portion of said current read address, and having said direction output in a second logic state when said second portion of said previous read address is not less than said second like portion of said current read address; and logic gate means coupled to a memory read signal and to said range output of said range comparator for generating an output signal to change prefetch direction of said look ahead read buffer when said memory read signal indicates a valid memory read cycle and said range output indicates said previous read address is on a same page as said current read address; and multiplexer means coupled to said directional comparator means to said output signal of said logic gate means for changing a current prefetch direction of said look ahead read buffer.

\* \* \* \* \*